United States Patent [19]

Jakob

[11] Patent Number: 4,872,994

[45] Date of Patent: Oct. 10, 1989

[54] METHOD AND APPARATUS FOR REMOVING ORGANIC LIQUIDS FROM WATER

[76] Inventor: Paul G. Jakob, 7201 Venetion Way, West Palm Beach, Fla. 33406

[21] Appl. No.: 174,459

[22] Filed: Mar. 28, 1988

[51] Int. Cl.$^4$ .......................................... B01D 17/022
[52] U.S. Cl. .................... 210/691; 210/747; 210/799; 210/170; 210/242.4; 210/460; 210/924; 166/265
[58] Field of Search ............... 210/671, 693, 799, 924, 210/747, 242.4, 170, 691, 460; 166/265

[56] References Cited

U.S. PATENT DOCUMENTS

| | | | |
|---|---|---|---|
| Re. 31,087 | 11/1982 | Sohl | 210/693 |
| 2,523,091 | 9/1950 | Bruce | 166/265 |
| 3,487,927 | 1/1970 | Yahnke | 210/693 |
| 3,669,275 | 6/1972 | Downs | 210/924 |
| 4,126,556 | 11/1978 | Swanson et al. | 210/242.4 |
| 4,172,039 | 10/1979 | Akiyama | 210/242.4 |
| 4,197,204 | 4/1980 | Mathes | 210/924 |
| 4,371,441 | 2/1983 | Mathes et al. | 210/799 |
| 4,469,170 | 9/1984 | Farmer, Jr. | 160/265 |
| 4,663,037 | 5/1987 | Breslin | 210/170 |

Primary Examiner—Richard V. Fisher
Assistant Examiner—Christopher Upton
Attorney, Agent, or Firm—Anthony A. O'Brien

[57] ABSTRACT

A method and apparatus for removing organic liquids from water is disclosed. The apparatus includes a wick of hydrophobic material which absorbs organic liquids and drains the absorbed liquid into a containment vessel. The collected organic liquid can be easily removed from the containment vessel.

6 Claims, 2 Drawing Sheets

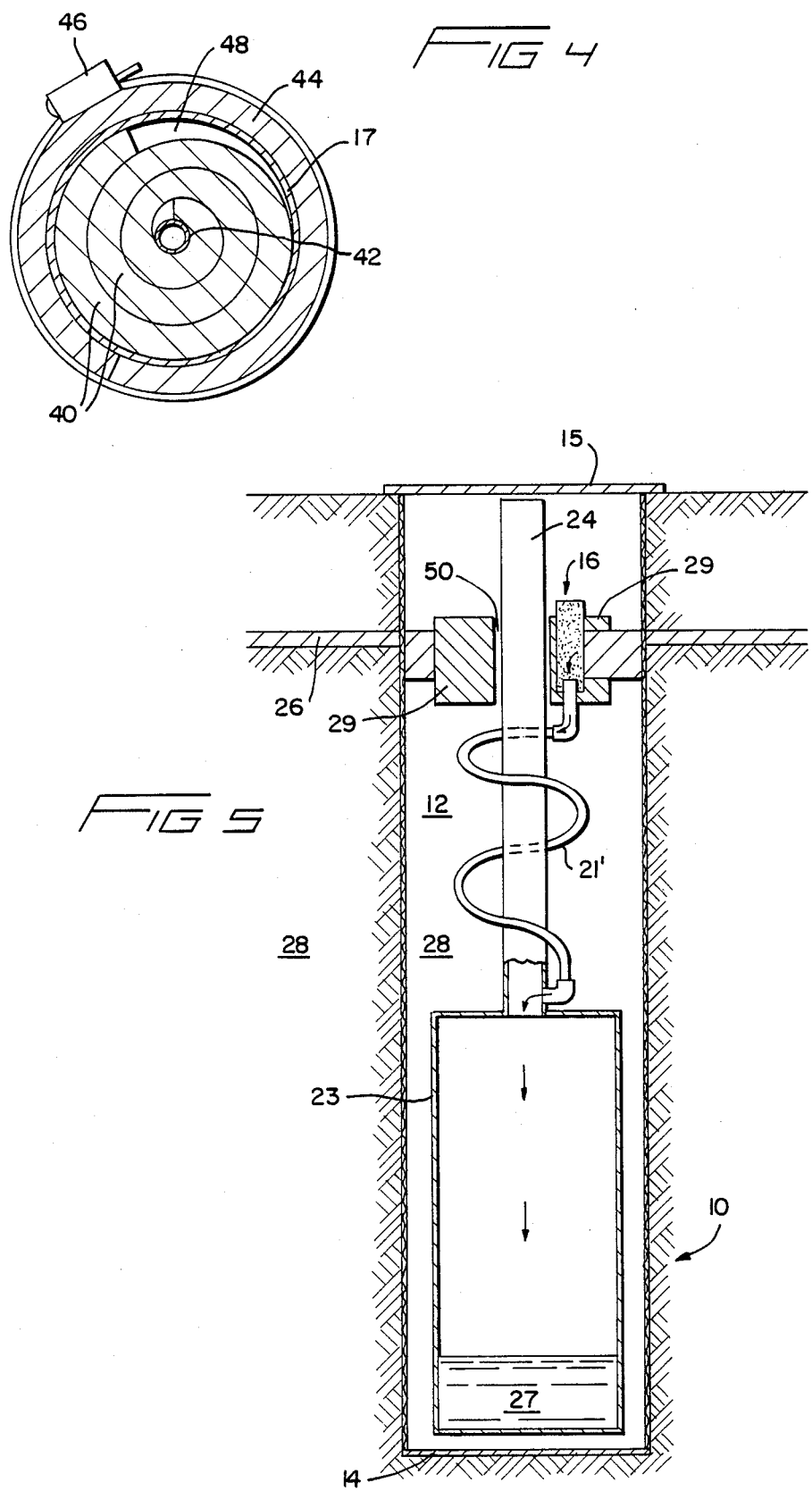

METHOD AND APPARATUS FOR REMOVING ORGANIC LIQUIDS FROM WATER

BACKGROUND OF THE INVENTION

1. Field of the Invention

This invention relates to a method and apparatus for removing organic liquids from water.

2. Background of the Invention

Although potable water supplies are more frequently contaminated by detergents, fertilizers and insecticides, contamination of water supplies by petroleum and other liquid hydrocarbons also occurs. As reported in the Apr. 3, 1987 edition of the Washington Post the Environmental Protection Agency (EPA) regards hydrocarbon spills as a "moderate" source of contamination of the underground drinking water sources for more than 100 million Americans. Leaks of petroleum products from storage tanks are also a source of hydrocarbon contamination of water. The EPA has proposed regulations regarding the clean-up of such spills and leaks but regulatory action alone is not sufficient to safeguard the environment and water supply from organic liquid contamination.

The instant invention relates to a process and device for the removal of organic liquids from a water supply. More particularly the device is able to remove organic chemicals having a specific gravity less than that of water and which float on water.

The device has a wick that absorbs the organic liquids and drains the organic liquid into a containment vessel by gravitational forces. The device is thus free of moving parts, removes organic liquids quickly from water and can be used to store the unwanted liquids while also allowing access to the organic liquid for subsequent disposal. The device works particularly well to remove petroleum products, especially hydrocarbons, and preferably gasoline from water.

There are known devices for removing petroleum products from water. For instance U.S. Pat. No. 3,487,927 discloses a device having a polyurethane material which attracts and retains oil while letting water pass through. The polyurethane material is suspended on a roller and squeezed by a second roller to recover the oil. The device requires drive means and a number of moving parts.

U.S. Pat. No. Re. 31,087 discloses the removal of food oil type substances from aqueous mixtures. The method includes contacting the mixture with an oleophilic fibrous web. The patent fails to disclose a device for the subsequent storage and disposal of such oil type substances as contemplated by the instant invention.

In view of the foregoing, it is an object of the instant invention to provide a simple device for the absorption of petroleum products from water.

Another object of the invention is to provide a device for the removal and storage of petroleum products from water.

Still another object of the invention is to provide a device for the collection of petroleum products from a water well which adjusts to fluctuations in the water table.

SUMMARY OF THE INVENTION

The present invention is summarized in that a process and apparatus for separating an organic liquid compounds from water wherein the organic liquid compound and water form two liquid phases separated by an interface; the process includes disposing a containment vessel below said interface, placing a hydrophobic wick vertically through the interface to absorb the organic liquid compound, connecting the wick in open communication with the containment vessel permitting the organic liquid compound to flow from the wick to the containment vessel for collection therein.

BRIEF DESCRIPTION OF THE DRAWINGS

FIG. 4 is a cross-sectional view taken along the line 4—4 of FIG. 3; and

FIG. 5 is an elevational view, in section, of the device of a second embodiment of the invention;

DESCRIPTION OF THE PREFERRED EMBODIMENTS

Figure 1:
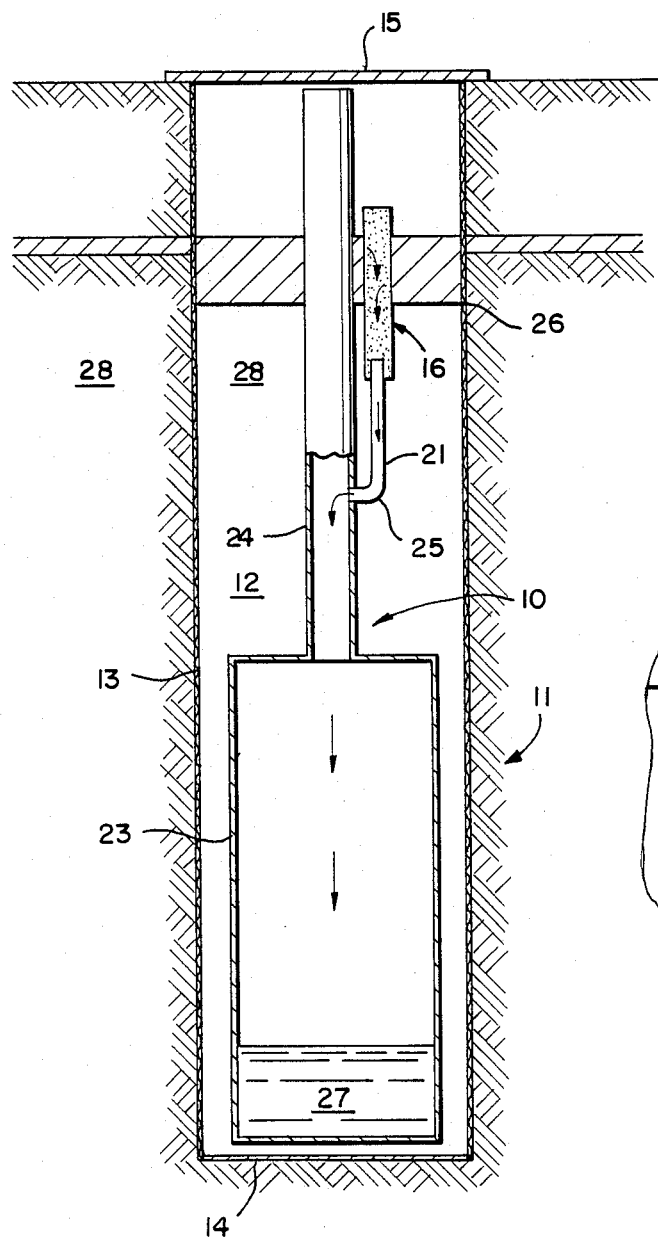
FIG. 1 is an elevational view, in section, of the device of a first embodiment of the invention.

A first embodiment of the invention, designated generally at 10 in FIG. 1, absorbs and collects organic liquids having a specific gravity less than that of water from a mixture of water and such organic liquids. It is contemplated that the device will be used to absorb and collect petroleum products, including hydrocarbons, such as gasoline, from water wells. However, it should be noted that there are other uses for the invention, such as the clean-up of many types of water table level spills, to which the methods and apparatus described herein could also be applied. The device substantially excludes water from the collection process.

In the first embodiment the device 10 is disposed in a monitor well or a water well designated generally as 11 in FIG. 1. The well includes an enclosed area 12 defined by a porous well screen 13, a solid bottom plate 14 attached to the bottom edges of the screen 13 and a well cap 15. The porous well screen 13 allows for the collection of ground water and any attendant organic liquids in the enclosed area 12.

The device 10 includes a collection chimney 24 which provides open communication to a collection vessel 23 such that organic liquids 27 collected in accordance with the invention can be removed from the device 10. The collection vessel 23 is preferably sized to have a diameter of only slightly less than the inner diameter of the enclosed area 12 defined by the well screen 13. The chimney 24 has a diameter generally smaller than the vessel 23. Due to the buoyant force exerted on the device 10 by the well water, the device 10 floats when inserted into the well. This buoyant force is overcome by the chimney 24 contacting the well cap 15.

Figure 2:
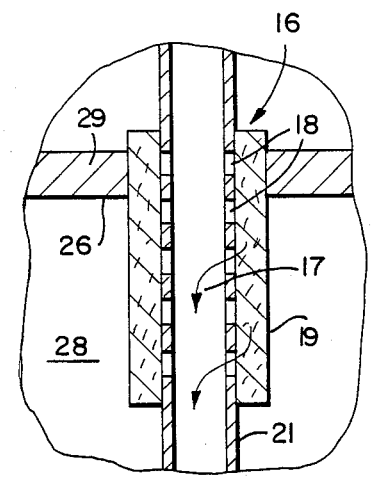
FIG. 2 is a magnified sectional view of a first embodiment of a wick portion in accordance with the invention.
Figure 3:
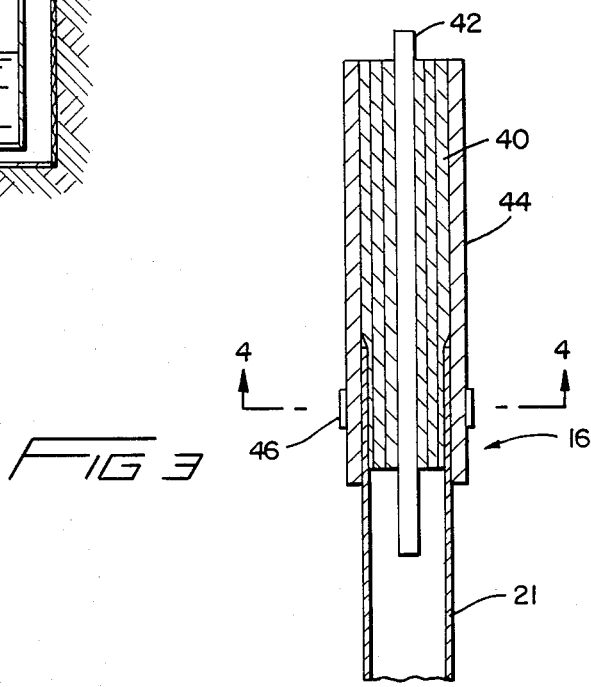
FIG. 3 is a magnified sectional view of a second embodiment of a wick portion in accordance with the invention.

A wick portion 16, described more fully in reference to FIGS. 2 and 3, is disposed adjacent the chimney 24 and held in fluid communication with the chimney 24 via a tube or conduit 21. Since the organic material to be collected has a specific gravity less than that of water, that material will float on the top surface of the water. This organic liquid/water interface is indicated at 26 in FIG. 1. The conduit 21 is of such length that the wick portion 16 is held at the interface or water table level 26 of the well.

The tube or conduit 21 includes an "L" connection portion 25 which is fitted in fluid connection to the chimney 24. The connection portion 25 may also be "U" shaped or in the form of gas trap, for reasons which will become clear. As organic material is gathered at the wick portion 16, it travels under the influence of gravity through the conduit 21, into chimney 24, and to the containment vessel 23 where it gathers as indicated at 27. As the vessel 23 fills with organic material, air is displaced and exits through the chimney 24 and out of the well. The well cap 15 is not hermetically sealed and air can pass freely through it. To further facilitate the passage of the air, the well cap is perforated.

Referring now to FIG. 2, a first embodiment of the wick portion 16 is shown. The wick portion 16 includes a tube 17 having a plurality of pores 18. The tube may be composed of materials which do not rust or decompose when exposed to an organic/aqueous environment. Suitable materials include polyvinyl chloride (PVC), brass or aluminum.

Disposed about the outer diameter of the tube is a sheet or web 19 composed of hydrophobic fibers having an affinity for organic compounds. Such fibrous webs are more fully disclosed in U.S. Pat. No. Re. 31,087, which disclosure is herein incorporated by reference. Examples of fibrous webs include polyolefins such as polyethylene and polypropylene. Preferably the web 19 is composed of polypropylene fibers having diameters in the range of 0.5 to 30 microns wherein 95% of the fibers have a diameter in the range of 5 to 10 microns. The fibrous web may be composed of a mixture of polyolefin fibers. Fibrous webs of this type are manufactured by the James River Corporation of Millford, N.J.

The web 19 is wrapped around the tube 17 and secured by any suitable means such that it covers all of the pores 18. The width of the web 19 is approximately 3/16 of an inch and a single layer or wrap of the web 19 may be sufficient for efficient collection of organic material. The pores 18 of the tube 17 have a diameter of about 0.25 inches. The pores 18 may be positioned randomly about tube 17, however, they are generally spaced about one inch apart. The tube 17 is approximately one inch in diameter and twelve inches in length, though the dimensions may vary in accordance with the volume of organic liquid to be collected. The tube 17 may merely be an integral extension of the conduit 21 discussed in reference to FIG. 1 or it may be a separate, fitted section. The wick portion 16 may be formed integrally and in coaxial alignment with the chimney 24 such that the conduit 21 is not necessary.

Critical to the process of recovering organic liquid from a body of water as described herein is the proper positioning of wick portion 16. Generally, when an organic liquid such as gasoline or oil comes in contact with water, two different liquid phases may be identified with an interface between them. The product layer or organic layer having a specific gravity less than that of water will float on the water. The wick portion 16 is placed in a vertical position, i.e., perpendicular to the organic liquid/water interface 26, and extend upwards just beyond the top of any liquid in the well.

In this position, the wick portion 16, having an affinity, or ability to selectively absorb organic liquid, will absorb substantially only organic liquid The organic liquid, by capillary action and/or diffusion will reach the pores 18 of tube 17 and be conveyed downward through tube 17 and conduit 21 to the collection vessell 23 as shown by the arrows in FIG. 1. The web 19, being hydrophobic, will effectively exclude water from the collective process. This wicking mechanism allows for an efficient method of ridding a well or a body of water of an undesired organic liquid product. Generally water will not penetrate the fibrous web 19 so long as the water pressure is less than about eight inches as measured in a water column.

As described heretofore, once the organic liquid enters pores 18 of tube 17, it travels by the pull of a gravitational force down through conduit 21 and into containment vessel 23. The gravitational force will continue to pull organic liquid into the containment vessel so long as organic liquid 27 is present at the interface 26. As the level of organic product 27 rises in the storage vessel 23, air is displaced and is vented up through chimney 24. Volatile gasses which may be given off by the organic product are also vented up through chimney 24. Preferably connection 25 between conduit 21 and the chimney 24 is a gas trap type connection to prevent gasses from traveling up through wick 16, which would otherwise hinder the collection process.

Once organic liquid fills the storage area 23, which may be monitored electrically by devices well known, the liquid product 27 may be removed by siphoning or pumping the liquid out of the containment vessel 23 via the chimney 24. The device 10 thus allows for the continuous collection and storage of liquid organic product without labor expenditure. Periodic removal of the product within the containment vessel significantly exceeds a volume of liquid that could be recovered if a layer of organic product was pumped after it has accumulated, over a period of time, on the top of the water.

Referring now to FIGS. 3 and 4, a second and preferred embodiment of the wick portion 16 is shown. As shown in FIG. 3, a first, rolled piece of fibrous web 40 is fitted inside the tube 17 and a second piece of fibrous web 44 is fitted around the outside of the tube 17. The web 40, which is inserted into the tube 17 aproximately one inch, may be formed from flat stock and rolled into an essentially circular cross-section, shown more clearly in FIG. 4. Further, an atmospheric pressure venting tube 42 may be included and serve as a core for the rolled web 40. The tube 42 aids the wicking process of the web 40 by providing atmospheric pressure at the conduit 21. The tube 42 may be either solid or slotted along its length. The web 44, which is equal in length to the web 40, is a single thickness of fibrous material and is held in place by a hose-type clamp 46. The web 44 serves not only to aid the wicking action of the assembly but also prevents the passage of water into the small non-overlap area 48 of the web 40. In the preferred embodiment, the wick portion 16 is approximately twelve inches long and one inch in diameter. However, the dimensions of the assembly will vary in accordance with the amount of organic liquid to be collected.

As illustrated in cross-section at FIG. 4, the assembled wick portion 16 of FIG. 3 includes the fibrous webs 40 and 44 and the venting tube 42. Material collected by the wick portion 16 is pulled under the effects of gravity into the tube 17 and passed to the collection vessel 23 as described hereinbefore. In large production of the device 10 for commercial use, it is contemplated that the web 44 may be formed in a tubular configuration for ease in assembling. Further, the web 40 may be formed from thickened tubular fibrous stock. The web 40 is sized to have a slightly larger outer diameter than the inner diameter of the tube 17 in order that there is a tight fitting between the two.

A further, preferred embodiment of the device 10 is illustrated in FIG. 5. Due to fluctuations in the water table, the water level within the well 11 may rise and fall drastically. When large fluctuations occur, i.e., where the water level may vary over a range of six inches or more, a stationary wick portion 16 cannot efficiently utilize its surface absorbing capabilities to recover organic product. In such a case, a flexible conduit 21' is interposed in the downward flow path from the wick portion 16 between the tube 17 and the connection portion 25. The conduit 21' may be a spiraled flexible conduit or a conduit capable of expansion in the longitudinal direction. In such a configuration, the wick portion 16, may be provided with a flotation collar 29. The collar 29 is formed in a relatively thick cylinder shape of buoyant material having a cutout portion 50 to allow the organic liquid/water interface 26 to have access to the wick portion 16.

The invention has been described by reference to specific embodiments and drawings; however, the embodiments are not set forth to limit the scope of the invention but are used to particularly describe the invention and teach a best mode for using the invention.

What is claimed is:

1. A process for separating gasoline from water in a water well wherein an interface separates the gasoline from the water, comprising the steps of:
    disposing a containment vessel in a water well below an interface of gasoline and water;
    placing a floating wick vertically through the interface, said wick being hydrophobic, and absorbing said gasoline with said wick;
    connecting said wick in open communication with the water well above the containment vessel;
    permitting the absorbed gasoline to flow by gravity from said wick to said containment vessel for collection therein;
    removing the collected gasoline from said containment vessel; and
    venting said containment vessel to the atmosphere to displace gases in said containment vessel to the atmosphere.

2. Apparatus for separating gasoline from water in a water well wherein an interface defines separation of the gasoline from the water comprising:
    a containment vessel constructed and arranged in combination with a water well for the storage of collected gasoline and having a lower portion comprising a gasoline storage area and an upper portion comprising a chimney vented to the atmosphere and permitting removal of collected gasoline;
    a wick of hydrophobic material capable of absorbing gasoline operatively connected to flotation means for enabling said wick to be disposed in the water well above the containment vessel and extending vertically through the interface; and
    a conduit extablshing communication between said wick and said containment vessel permitting a gravity flow of gasoline from said wick to said containment vessel.

3. The apparatus according to claim 2 wherein said wick comprises a tubular element having a plurability of pores and a polyolefin sheet disposed about the outer periphery of said tubular element.

4. The apparatus according to claim 2 wherein said wick includes a tubular element, a first fibrous web roll fitted inside said tubular element, and a second fibrous web roll fitted outside said tubular element.

5. The apparatus according to claim 2 wherein the conduit is flexible and spiraled in a relaxed condition about the chimney.

6. The apparatus according to claim 5 wherein said flotation means comprises a flotation collar fixed to a top portion of the wick to maintain the wick in floating contact with the gasoline to be collected.

* * * * *